United States Patent
Arakawa et al.

[11] Patent Number: 5,974,231
[45] Date of Patent: Oct. 26, 1999

[54] DRIVING APPARATUS FOR PRINTER CAPABLE OF RECORDING MULTIPLE GRADATION, AND PRINTER WITH DRIVING APPARATUS

[75] Inventors: Hiroaki Arakawa; Tatsuro Ooishi; Yoshikazu Maekawa; Osamu Murata; Yutaka Aoki, all of Hino, Japan

[73] Assignee: Konica Corporation, Tokyo, Japan

[21] Appl. No.: 09/013,707

[22] Filed: Jan. 26, 1998

[30] Foreign Application Priority Data

Jan. 30, 1997 [JP] Japan .................................. 9-016653

[51] Int. Cl.⁶ .................................................. G06K 15/00
[52] U.S. Cl. .......................................... 395/109; 395/115
[58] Field of Search ...................... 395/101, 109, 395/114, 115, 116; 345/521, 508, 511, 525, 526, 509, 203; 358/404, 444, 455, 457, 458, 460, 524; 382/305

[56] References Cited

U.S. PATENT DOCUMENTS 4,342,051  7/1982  Suzuki ................................. 358/460
4,368,491  1/1983  Saito ................................... 358/460

FOREIGN PATENT DOCUMENTS 4-31220   5/1992  Japan .
4-74906  11/1992  Japan .

Primary Examiner—Arthur G. Evans
Attorney, Agent, or Firm—Frishauf, Holtz, Goodman, Langer & Chick, P.C.

[57] ABSTRACT

A driving apparatus for a printer, includes: a first memory for successively storing pixel data by one pixel on the basis of data of a plurality of bits constituting one pixel which represents gradation, which are inputted in parallel, and after storing a predetermined number of pixel data, for outputting in parallel the stored pixel data; a position information signal outputting device provided in accordance with each of outputs from the first memory for outputting a position information signal within a pixel according to each pixel data of the first memory; and a recording device provided in accordance with each of outputs from the position information signal outputting device and driven according to the position information signal within the pixel.

13 Claims, 11 Drawing Sheets

DRIVING APPARATUS FOR PRINTER CAPABLE OF RECORDING MULTIPLE GRADATION, AND PRINTER WITH DRIVING APPARATUS

BACKGROUND OF THE INVENTION

The present invention relates to a printer capable of recording multiple gradation, and in more particularly, to a driving apparatus for a printer which is capable of recording multiple gradation and is usable as a hard copy apparatus for recording gradation image data coming from a computer and others, and to that printer.

Heretofore, in the case of a printer in which binary-coded gradation data are used for recording, on-off recording has been conducted, in accordance with binary-coded data, by a plurality of recording elements provided on a recording head. For example, in the case of an ink jet printer, a print head having thereon plural exhaust nozzles has been transmitting image data equivalent in terms of volume to a single jet of each nozzle to driving IC of the head each time, and the image data thus transmitted have been conducting ink jet for forming an image.

Recently, various printers have been conducting gradation recording, and an ink jet printer has also been conducting the gradation recording as in other printers. As an example of the gradation recording, there has been known an ink jet printer employing an error diffusion method. In the case of this ink jet printer, when outputting density of halftones, density of an ink drop constituting a dot is fixed, and the number of ink drops to be jetted to an area corresponding to plural pixels is changed, whereby the number of dots on an area spreading to some extent is changed to be approximated to the halftones.

On the other hand, a printer employing no error diffusion method has also been known. This method provides an effect similar to that brought about by changing dot sizes. In the case of this gradation recording, ink jet has been conducted for image forming through the same operations as those in the recording with conventional binary-coded gradation data wherein data of a pixel are constituted with plural bits, and signals equivalent to a single ink jet, namely, to one bit are subjected to serial transmission to a head by plural nozzles.

For example, Japanese TOKKOHEI 4-31220 discloses a technology wherein gradation data of plural bits are subjected to serial transfer to registers and latches, after they are converted to one bit, namely, converted to data corresponding in terms of quantity to one recording. Further, TOKKOHEI 4-74906 discloses an apparatus wherein gradation data of plural bits are converted to serial data and pulses having different number of pulses are generated from data equivalent to one pixel transmitted serially.

In technologies of TOKKOHEI 4-31220 and TOKKCOHEI 4-74906, however, image data are transmitted to a head on a serial basis, namely, on a basis of a unit of one bit, and recording requires longer time accordingly than in the occasion for recording binary-coded image data. For example, in the case of gradation recording for 16-gradation, the time required for transmission of signals to a head is 16 times that for the occasion which is not for gradation recording. Recording of gradation data is executed by repeating, for one pixel, the recording operations identical to those in binary-coded recording. When transmitting gradation data to a head serially, signals only for a single driving among recording operations for plural times are all that can be transmitted to the head, per one clock, for example.

Accordingly, when transmitting gradation data serially to a head in gradation recording, at least clocks in quantity of the gradations are required to complete the recording for one pixel, big problems such as signal transmission and a fall of recording speed caused by the signal transmission are caused, when compared with binary-coded recording wherein recording for one pixel can be completed with one clock.

Therefore, in the structure where image data are transmitted serially to a head in a multi-gradation printer, it is also possible to consider, for overcoming a fall of recording speed, the structure to raise transfer frequency and thereby to speed up recording operations of a head.

However, in an ink jet printer of the type wherein a head is installed on a carriage and scanning is made in the primary scanning direction for recording, another problem is caused. In the case of an ink jet printer or the like, a carriage moves together with a head and a driver for the head both installed on the carriage. A length of movement of the carriage depends on dimensions of a recording material, and it exceeds 20 cm, for example, in the ink jet printer which records on a recording sheet in A4 size. Therefore, the carriage and a control board are connected with a long and flexible cable. From a viewpoint of radio interference noise, it is not appropriate to transfer the high frequency data representing gradation data by connecting a carriage and a control board with a long and flexible cable as doing in an ink jet printer, because a noise is considered to be generated in the cable.

In addition, when providing a multi-gradation printer capable of outputting an image with high image quality, the number of gradations is increased causing an increase of the number of data, and driving frequency for a head is increased more and more, making it difficult to control.

As stated above, it is difficult to speed up a multi-gradation printer. In addition, even when speedup of a multi-gradation printer is realized, following problems are still foreseen.

In the case of an ink jet printer wherein gradation of an image to be outputted is controlled by the number of ink ejection, ejected several ink drops in quantity equivalent to one pixel are ejected continuously. Therefore, the several ink drops are stuck to be superposed at about the same position on a sheet. An extent of superposition on the superposed portion varies depending on the speed of relative movement between a recording medium such as a recording sheet and a nozzle and on the number of ejection of ink drops per a period of time.

For increasing the number of gradations, the number of ink drops to be ejected per one pixel is also increased. When the number of ink drops to be ejected per one pixel is increased, the superposed position where ink drops are overlapped each other is undesirably increased. In the case of an ink jet printer which records one pixel with ink drops in a single ejection like one employing an error diffusion method, it is possible to realize easily that no superposed portion is generated. However, in the ink jet printer wherein gradation of an image to be outputted is controlled by the number of ejection of ink, even when the number of ink drops is increased in an attempt to increase the number of gradations, the superposed portion is finally increased undesirably, resulting in difficult obtaining of gradation changes.

This trend appears more remarkably in the case of a special sheet for exclusive use such as a glossy sheet for ink jet use prepared for application to ink jet. These special sheets are coated for the purpose to prevent that ink soaks into a fiber of the sheet to run, expanding a dot to lower image quality. However, when attempting to control gradation of an image by the number of ink ejection, when hygroscopic property of ink is high, adhering ink drops soak into the sheet and color a wide area. For this reason, even when a superposed portion of ink drops is increased, a ratio of an area of no superposition is high, which makes it possible to obtain a gradation change slightly. However, ink drops adhering to a special sheet do not soak into the sheet but form one drop due to their surface tension undesirably. Therefore, a change of in area corresponding to adhering ink drops is small, and it is very difficult to obtain a gradation change, which is a problem.

SUMMARY OF THE INVENTION

The present invention is to solve the problems mentioned above, and by conducting gradation recording by means of image data composed of data in parallel representing plural bits each having gradation information, it provides a driving apparatus for a multi-gradation printer capable of conducting gradation recording at high speed without enhancing driving frequency for a head driver and provides the multi-gradation printer, and prevents superposition of dots when recording one pixel with plural dots by the printer and the driving apparatus for the printer, so that an accurate gradation change may be obtained.

For an ink jet printer, in particular, the invention is to prevent superposition of ink drops when jetting ink drops to one pixel so that an accurate gradation change may be obtained.

It is further to convert parallel data each having gradation at a head section into the number of ejection of ink drops so that gradation recording may be obtained.

The objects mentioned above can be attained by the following means.

Namely, a driving apparatus for a printer provided therein with:

a first storage means which stores pixel data in succession for each pixel composed of plural bits showing gradation, with data of plural bits inputted in parallel, and outputs in parallel the pixel data stored after storing pixel data in prescribed number;

a position information signal outputting means which is provided corresponding to each of output of the first storage means, and outputs in-pixel position information signal corresponding to each pixel data of the first storage means; and a recording means which is provided corresponding to each position information signal outputting means, and is driven based on the in-pixel position information signal, makes it possible to conduct gradation recording at high speed, because data in parallel each having gradation information are transmitted, as they are, to a head driver to be processed. It further makes it possible to conduct gradation recording at high speed, because gradation recording is conducted after converting to the data to be recorded by the recording means, by converting to the intermitted data in series wherein a recording position in a recording pixel is portioned out by the position information signal outputting means depending on data in parallel each having gradation, namely, by converting to the intermitted data of one bit.

In addition to the foregoing, plural bits representing gradation are always portioned out to be recorded at a lattice point or at a target position. Therefore, it has become possible to prevent superposition at each pixel, and to obtain a gradation change accurately. Further, since the recording position at each pixel is portioned out, stripe-shaped noise is not caused on an image outputted when plural pixels are recorded.

When output of the position information signal means is selected and a selection means for recording with a desired recording means among the aforesaid recording means is; provided in the driving apparatus for a printer mentioned above, the recording means can be used selectively for recording. Due to this structure, when recording characteristics of each nozzle vary to be different from others, it is possible to prevent streaks which are caused on an image by using all recording means as they are. In the case of a driving apparatus for an ink jet printer wherein a recording means is equipped with plural nozzles, in particular, it is possible to prevent, by using the nozzles selectively, the streaks caused by jetting characteristics of the nozzle.

In these driving apparatuses for a printer, the above-mentioned in-pixel position information signals may be made to be information signals to be recorded at recording positions where plural dots are portioned out in the primary scanning direction from the center of each pixel to be symmetrical.

Namely, a printer having therein:

a first storage means which stores pixel data in succession for each pixel composed of plural bits showing gradation, with data of plural bits inputted in parallel, and outputs in parallel the pixel data stored after storing pixel data in prescribed number;

a position information signal outputting means which is provided corresponding to each output of the first storage means, and outputs in-pixel position information signal corresponding to each pixel data of the first storage means;

a recording means which is provided corresponding to each position information signal outputting means and is driven based on the in-pixel position information signal;

a carriage which is provided with the first storage means, the position information signal outputting mean, and the recording means and is held to be movable in the course of recording; and a data transfer means which transfers data between the carriage and a board provided on the printer main body, and is flexible to follow a movement of the carriage, has made it possible to conduct gradation recording at high speed, because data in parallel having gradation information are transferred to a head driver to be processed as they are. In addition, gradation recording can be conducted at high speed, because gradation recording is conducted after converting to data recorded by the recording means by converting to intermitted data of serial wherein recording positions are portioned in a recording pixel by the position information signal outputting means in accordance with data in parallel having gradation, namely to intermitted data of one bit.

In addition, plural bits indicating gradation are always portioned about a lattice point or a target portion to be recorded. Therefore, it has become possible to obtain gradation change by preventing superposition on each pixel. Further, since recording positions on each pixel are portioned, streak-shaped noise does not appear on an outputted image when plural pixels are recorded.

If this printer is structured so that an output of the position information signal means is selected and a selection means for causing a desired recording means among the recording means to record is provided, it is possible to conduct recording by using the recording means selectively. Due to this structure, when recording characteristic, of each nozzle vary to be different from others, it is possible to prevent streaks which are caused and appear on an image when all recording means are used as they are. In particular, in the case of a driving apparatus for an ink jet printer wherein a recording means is provided with plural nozzles, streaks caused by ejection characteristics of a nozzle can be prevented if the nozzle is used selectively for recording.

In these printers, the above-mentioned in-pixel position information signals may be made to be information signals to be recorded at recording positions where plural dots are portioned out in the primary scanning direction from the center of each pixel to be symmetrical.

BRIEF DESCRIPTION OF THE DRAWINGS

FIG. 8(a) shows a conceptual diagram wherein each pixel outputted by a conventional ink jet printer is enlarged and arranged, while

FIG. 9(a) shows a conceptual diagram wherein each pixel outputted by a conventional ink jet printer in which an amount of ink per one jet is less than that used in FIG. 8(a) is enlarged and arranged, while

DETAILED DESCRIPTION OF THE PREFERRED EMBODIMENT

Embodiments of the invention will be explained as follows with an ink jet printer as an example, referring to FIGS. 1–7.

Figure 1:
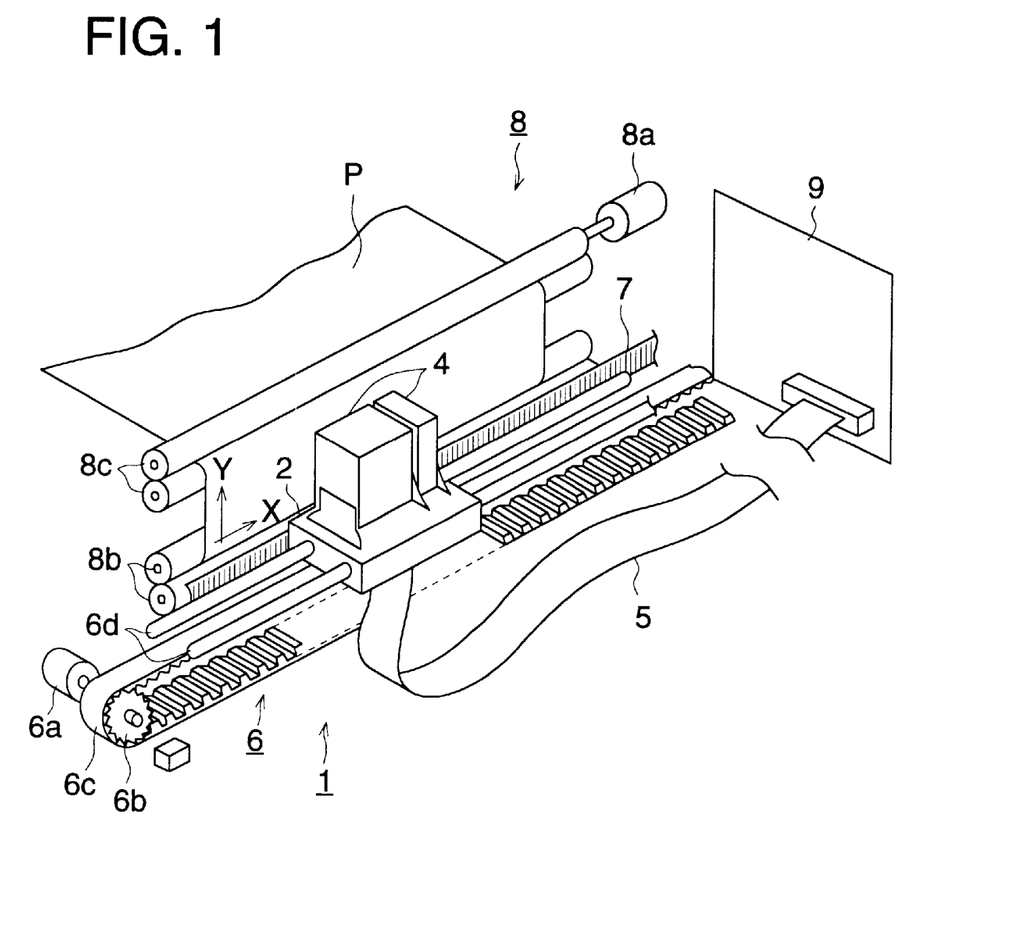
FIG. 1 is a perspective view showing primary portions of ink jet printer 1.

FIG. 1 is a perspective view showing primary portions of ink jet printer 1.

Carriage 2 is a casing made of resin wherein head 17 and head driver 16 are housed. The head driver 16 housed in the carriage 2 is constituted with ICs and is connected to control board 9 with flexible cable 5 derived from the carriage 2.

The carriage 2 is caused by carriage driving mechanism 6 to reciprocate in the primary scanning direction shown with arrow X in the diagram. The carriage driving mechanism 6 is structured to include motor 6a, pulley 6b, timing belt 6c and guide rail 6d, and the carriage 2 is fixed on the timing belt 6c.

When the pulley 6b is rotated by the motor 6a, the carriage 2 fixed on the timing belt 6c is moved in the direction of arrowed mark X in the diagram. The guide rail 6d represents two round bars arranged to be in parallel with each other which pass through penetration holes of the carriage 2 so that the carriage 2 may slide thereon. Due to this, the timing belt 6c is not bent by the weight of the carriage 2, and the carriage 2 can reciprocate on the straight line accordingly. The direction of movement of the carriage 2 can be changed by reversing the direction of rotation of the motor 6a, and the speed of movement of the carriage 2 can be changed by changing the rotational frequency.

Ink cartridge 4 has therein an ink tank. An ink inlet of the ink tank is opened when the ink cartridge 4 is set on the carriage 2 so that the ink inlet is connected with an ink supply pipe, and it is closed when the ink inlet is disconnected from the ink supply pipe. In this way, ink is supplied to head 17. The carriage 2 is provided with a seat for the cartridge 4 so that an ink cartridge containing ink of each color of Y, M, C and K may be mounted on or dismounted from the seat. In the present embodiment, an ink cartridge for K (black) only is housed in a separate cartridge, and ink tanks for other three colors are contained in the same cartridge.

The flexible cable 5 is related to a data transfer means of the invention, and it is a flexible film on which wiring patterns including data signal lines and a power supply line are printed, and it follows movement of the carriage 2 in the course of data transfer between the carriage 2 and the control board 9.

Encoder 7 is a transparent resin film on which scale marks are provided at prescribed regular intervals, and this scale mark is detected by a photosensor provided on the carriage 2 so that the speed of movement of the carriage 2 may be detected.

Sheet conveyance mechanism 8 is one to convey recording sheet P in the sub-scanning direction shown with arrowed mark Y in the diagram, and it is constituted to include conveyance motor 8a, paired conveyance rollers 8b and paired conveyance rollers 8c. Both of paired conveyance rollers 8b and paired conveyance rollers 8c are driven by the conveyance motor 8a in a way that the paired conveyance rollers 8c is rotated through an unillustrated gear train at a slightly higher peripheral speed. After being fed out of a sheet-feeding mechanism (not shown), the recording sheet P is interpolated between the paired conveyance rollers 8b rotated at a constant speed where the conveyance direction is corrected by an unillustrated sheet-feeding guide, and then is interpolated by the paired conveyance rollers 8c to be conveyed. Since the peripheral speed of the paired conveyance rollers 8c is slightly higher than that of the paired conveyance rollers 8b, the recording sheet P can pass through the recording section without being slackened. Further, the speed for moving the recording sheet P in the sub-scanning direction is set to be a constant speed.

Thus, the carriage 2 is moved in the primary scanning direction at a constant speed while the recording sheet P is being moved in the sub-scanning direction at a constant speed, so that ink jetted out of the head 17 is stuck to the recording sheet P for coloring and thereby an image is recorded on a prescribed range on one side of the recording sheet P.

Figure 2:
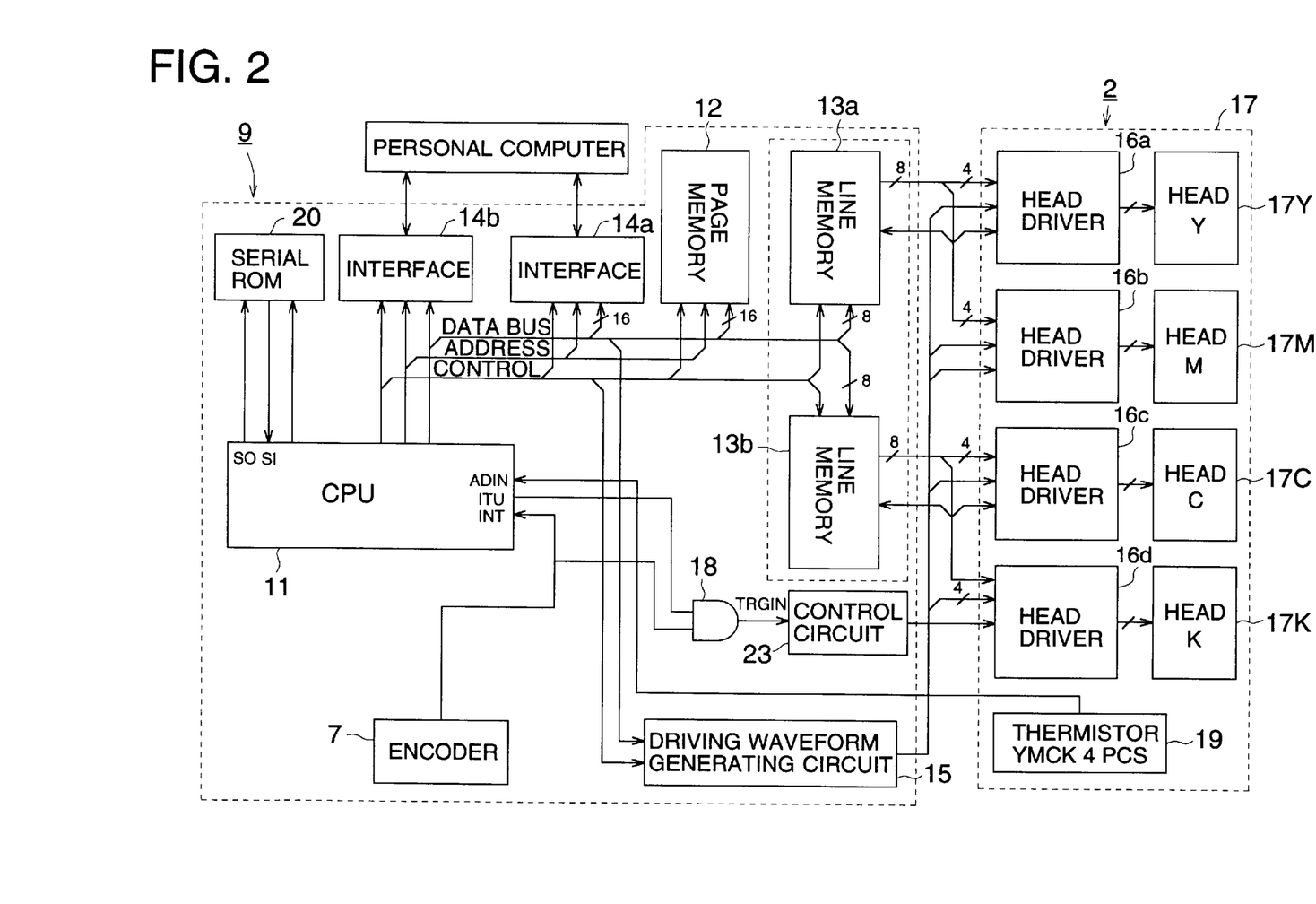
FIG. 2 is a circuit block diagram of ink jet printer 1.

FIG. 2 is a block diagram of circuits in ink jet printer 1.

The control board 9 is provided therein with CPU 11 which controls the ink jet printer 1 totally, and is connected to head driver 16 of the carriage 2 with the flexible cable 5 as explained earlier.

Page memory 12 stores image data received from a personal computer which utilizes the ink jet printer 1 as a peripheral equipment. The storage capacity of the page memory 12 can be determined based on the number of bits of gradation image data handled by the personal computer, the number of dots, the speed of transferring signals and processing speed of CPU.

Since it is possible to record at an extremely high speed if the driving apparatus for a multi-gradation printer related to the invention is used, SCSI (14a) and IEEE 1284 (14b) in parallel interface are made to be utilized for an object of the speedup of image data transfer, without utilizing serial interface.

Line memories 13a and 13b are related to the third storage means of the invention, and each of them is used as a line memory which stores image data of each pixel arranged in a line in the primary scanning direction to be recorded in the course of recording on recording sheet P, and each image data is transferred from page memory 12 on a basis of several bits of gradation data. Though two line memories 13a and 13b both of a 16-bit processing type are used in parallel in the present example, it is also possible to structure with one line memory of a 16-bit processing type. A data signal line from the page memory 12 is of a 16-bit type, and it allocates 8 bits to each line memory 13. Image data of line memories 13a and 13b are transferred to head driver 16 through flexible cable 5.

Head drivers 16a–16d are constituted with ICs and they are provided so that each of them corresponds to each color. Each IC is connected to a shift register related to the first storage means with 128 bits×4 of the invention, and image data from line memories 13a and 13b are stored temporarily in this shift register. Incidentally, the head driver 16 may be made plural for one color, and when drivers for four colors are packaged in one IC, miniaturization can be realized. Head driver 16 has a 4-bit data signal line, and when head driver 16 is connected in series with this signal line, it is possible to structure so that image data which failed to be stored in the shift register in the preceding step can be stored in the shift register in the following step.

Each of heads 17Y, 17M, 17C and 17K for four colors related to the storage means of the invention has 128 nozzles, and nozzles constituting each head are arranged in the sub-scanning direction so that plural lines may be recorded simultaneously. Incidentally, a combination of head driver 16 and head 17 in the present embodiment is an example of an embodiment of a driving apparatus for a multi-gradation printer of the invention.

In the present embodiment, image data of yellow are transferred from line memory 13a to head driver 16a through a data signal line of a 4-bit type. Then, 128 image data for yellow transferred to head driver 16a are processed in parallel so that recording by head 17Y may be executed. In the same way as in the foregoing, image data of magenta are transferred from line memory 13a to head driver 16b and recording by head 17M is executed. Image data of cyan are transferred from line memory 13b to head driver 16c and recording by head 17C is executed, and image data of black are transferred from line memory 13b to head driver 16e and recording by head 17K is executed. Detailed operations of the head driver 16 will be explained later.

AND gate 22 outputs to head driver 16 the TRGIN signal which starts ink jet at the moment when the carriage 2 arrives at a prescribed position on its forward travel after starting its reciprocating movement based on information detected by an encoder. Receiving this TRGIN signal, the head driver 16 sends driving signal, thus ink jet by head 17 is conducted.

The head driver 16 supplies driving signals to an electromechanical converting element provided on each nozzle of head 17 through a 128-bit data signal line, and when the electromechanical converting element receives this driving signal and is deformed, ink in a head is jetted. Incidentally, though the electromechanical converting element includes various ones, piezoelectric element will be explained in the present embodiment as an example.

In general, recording is executed when liquid drops are jetted from a nozzle in accordance with driving signals in an ink jet printer. Ink drops are recorded on recording sheet P in succession, making it possible to record on an area corresponding to the number of liquid drops and to conduct gradation recording.

When environmental conditions are constant, the speed for jetting liquid drops out of nozzle head 17 can be raised by enhancing driving voltage for the piezoelectric element. To the contrary, stable image quality can be obtained by using driving signals whose waveform varies depending on peripheral environment of ink jet printer 1. In the structure of the present embodiment, temperature in the vicinity of head 17 is measured by thermistor 19, and a waveform is changed depending on the measured temperature. Due to this structure, even when ink viscosity varies depending on the temperature, it is possible to drive a head in accordance with the changed viscosity. Incidentally, it is more preferable that rumidity conditions are made to be parameters with which a waveform of driving signals is changed.

A waveform of a driving signal, when it is changed depending on the environment, makes it possible to obtain high grade output images. Therefore, various waveforms of driving signals are transferred from CPU 11 to SRAM (not shown) in driving waveform generating circuit 15 to be stored therein as digital data. This SRAM can be structured by the use of FIFO or the like.

Since the waveform data in the present embodiment stored in this SRAM outputs data with 4 bits and 16 gradations per color, data stored in the SRAM in the driving waveform generating circuit 15 are one wherein the waveform to repeat the amplitude of a basic waveform 16 times are converted into digital data. Immediately before the start of a printing, CPU 11 transmits the contents of a waveform data to SRAM so that an optimum voltage may be impressed in accordance with temperature conditions detected by thermistor 19, and rewrites waveform data properly. Some waveform data for each temperature condition are prepared in CPU 11, or waveform data are prepared by calculating from the temperature variable corresponding to the temperature detected each time. In the driving waveform generating circuit 15, waveform data of this driving signal are demodulated to analog waveform through D/A conversion and amplified, and then are outputted to head driver 16.

Next, a block diagram of a head driver in FIG. 3 will be explained. The head driver 16 in the present embodiment is structured to include shift register 31 representing an example of the first storage means of the invention, latch 32 representing an example of the second storage means of the invention, gradation control block 33 representing an example of a position information signal outputting means of the invention, selection gate 34 representing an example of a selection means of the invention, level shifter 35, driver 36 and logic section 37. In the embodiment, each means constituting head driver 16 is of the structure that corresponds to 4 bits.

Gradation image data whose one pixel is composed of plural bits, 4 bits in this case, are transferred from line memory 13 to head driver 16 in series on a basis of a pixel. In FIG. 3 shows how the first 4-bit pixel data DAT0, DAT1, DAT2 and DAT3 are transmitted through 4-bit data signal lines.

The shift register 31 has a capacity capable of storing image data with pixels in quantity corresponding to one jet from nozzle head 17. In the embodiment, image data equivalent to 128 pixels arranged in the sub-scanning direction are stored. When carriage 2 reaches the position which is suitable for recording, control circuit 23 outputs LOAD signals, and latch 32 receives the LOAD signals and then latches image data outputted in parallel from the shift register 31.

As stated above, by transferring image data having the data size of 128 nozzles×4 bits in parallel on a 4-bit basis, it is possible to reduce the time for data transfer, namely the driving time for a recording head to 1/16 thereof. An effect of this reduction is heightened as the number of ink drops jetted for one pixel representing the gradation number is increased.

Gradation control block 33 outputs drive control signals corresponding to image data latched by the latch 32. The gradation control block 33 is equipped with plural logic section 37 corresponding to output of the latch. Each logic section 37 is equipped with a structure shown in FIG. 7, for example, and outputs drive control signals shown in FIG. 4 depending on a gradation value of image data.

Figure 4:
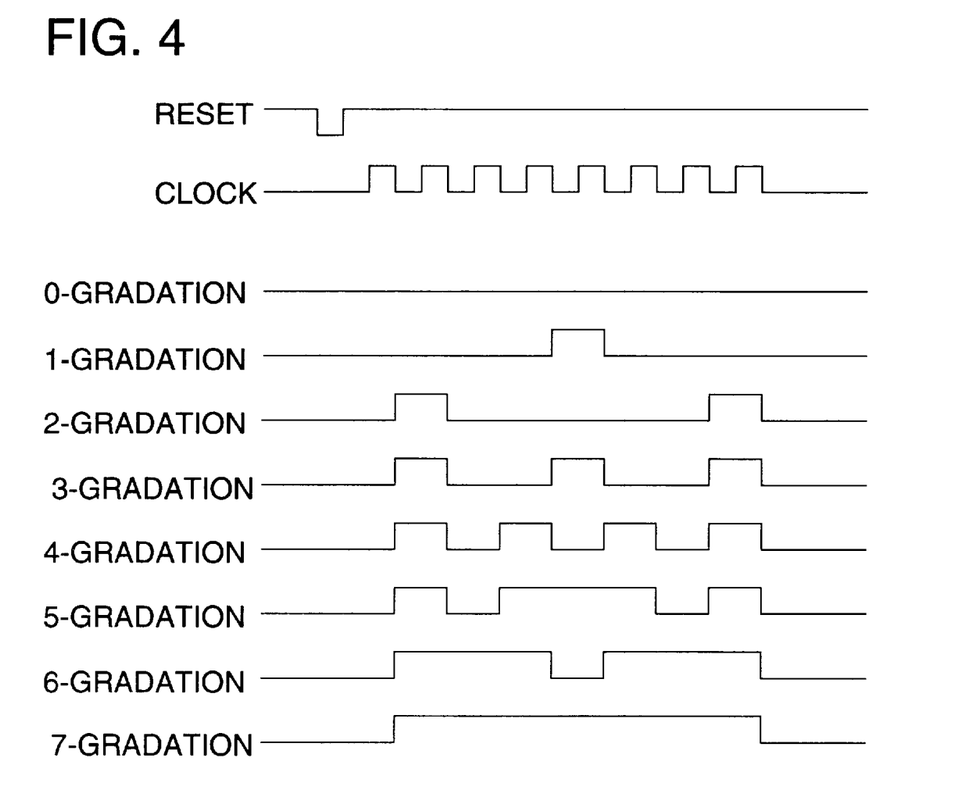
FIG. 4 is a timing chart illustrating drive control signals outputted by logic section 37.
Figure 5:
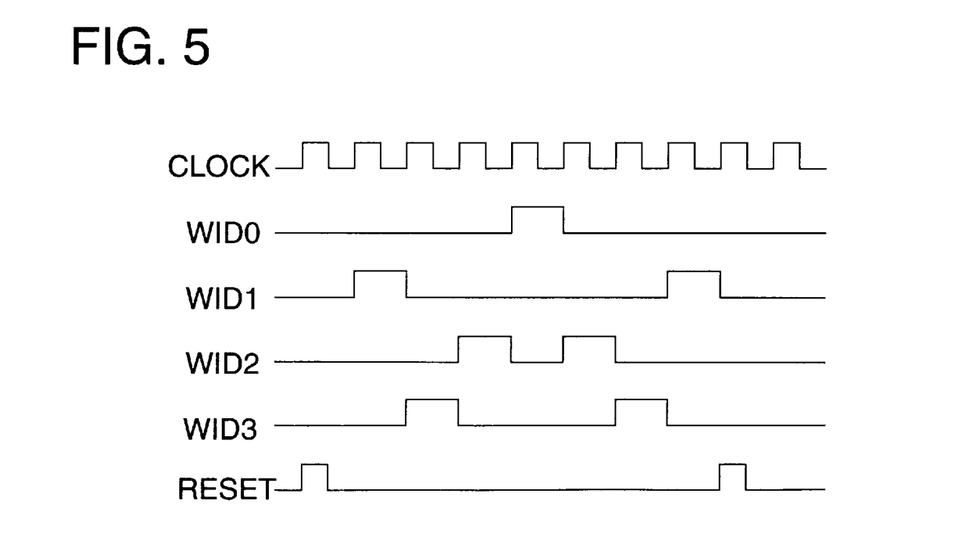
FIG. 5 is a timing chart illustrating operations of logic section 37.
Figure 6:
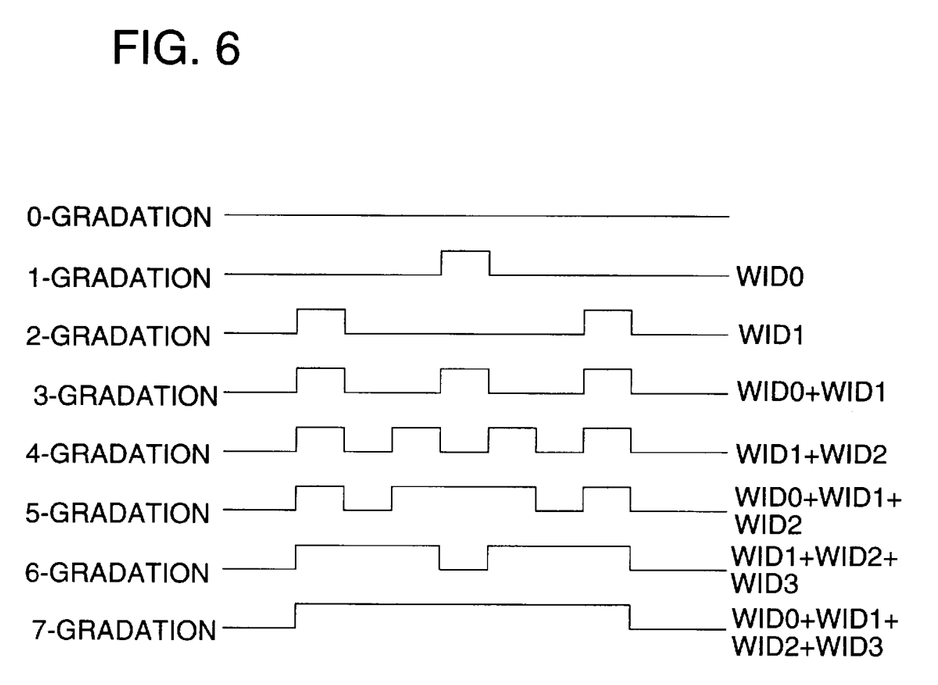
FIG. 6 is a timing chart illustrating operations of logic section 37.
Figure 7:
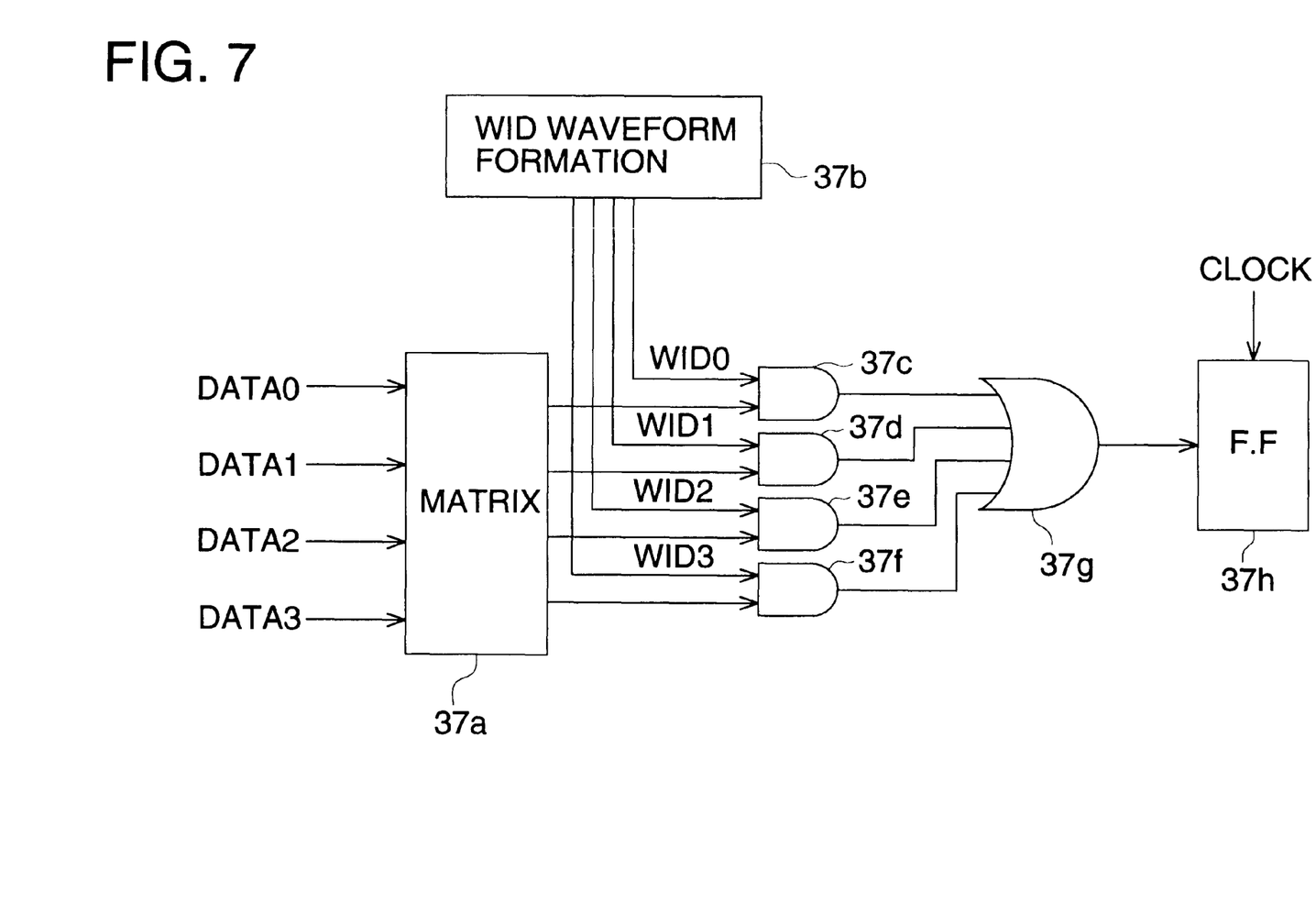
FIG. 7 is a block diagram showing an example of the structure of logic section 37.

Next, operations of the logic section 37 will be explained, referring to FIGS. 4–7. FIG. 4 is a timing chart illustrating drive control signals outputted by the logic section 37. Each of FIGS. 5 and 6 is a timing chart illustrating operations of the logic section 37. FIG. 7 is a block diagram showing an example of the structure of the logic section 37.

Waveform forming section 37b forms waveforms WID0–WID3 shown in FIG. 5, and outputs each of waveforms WID0–WID3 to one side of each of input terminals of AND circuits 37c–37f.

Matrix 37a outputs high level signals to the other side of each of input terminals of AND circuits 37c–37f corresponding to image data representing output of the latch 32. Due to this, waveforms WID0–WID3 can be selected properly depending on density values of image data.

OR circuit 37g outputs a waveform (see FIG. 6) composed from the waveforms WID0–WID3 selected by the matrix 37a and AND circuits 37c–37f.

Flip-flop 37h generates synchronization output of OR circuit 37g at the fall of clock signal CLOCK. As shown in FIG. 6, when image data outputted by the latch 32 show 0-gradation, waveforms WID0–WUD3 are not selected and the output of OR circuit 37g remains to be at a low level. When the image data show 1-gradation, waveform WID0 only is selected, and a high level equivalent in terms of a period to one cycle of clock signal CLOCK is outputted in synchronization with the fall of clock signal CLOCK in the fourth jet, and a high level is outputted in the other period. In further example, when the image data show 4-gradation, a high level is outputted in synchronization with the fall of the clock signal at the 1st jet, 3rd jet, 5th jet and 7th jet, while a low level is outputted in synchronization with the fall of the clock signal at the 2nd jet, 4th jet, 6th jet and 8th jet, because output of OR circuit 37g is one wherein waveforms WID1 and WID2 are selected.

Due to this gradation control block 33, data in parallel with plural bits are converted into intermitted data with one bit which represent data in series.

Explanation will be made again, returning to FIG. 3. Selecting gate 34 is related to a selection means of the invention, and it conducts switching for dividing nozzles of head 17 into two groups including a group composed of odd-numbered nozzles and another composed of even-numbered nozzles, and for driving in succession. In the selecting gate 34, 128 AND gates are arranged in parallel, and an output terminal of each gradation control block 33 is connected to one side of an input terminal, and the other side of the input terminal is connected with the control circuit. X and Y represent selection signals for selectively using nozzles of the head 17 which conducts recording, and they are outputted from control circuit 23. In the present embodiment, recording means are divided into two groups including one group of odd-numbered recording means and the other group of even-numbered recording means, by using selection signals X and Y, so that driving, namely, jetting may be conducted alternately. In this driving method, each time ink drops equivalent in quantity to one pixel, namely to the maximum of 16 ink drops, are jetted, ink is jetted from the adjoining nozzle. This is to inhibit, through a driving method to jet alternately as stated above, the problem of streaks which appear on an image when all nozzles are used continuously under the condition that each nozzle has different jetting characteristics. Though nozzle head 17 is divided into two groups of odd-numbered and even-numbered recording means in this example, the nozzle head 17 may also be divided into two or more groups.

Level shifter 35 level-shifts driving signals representing output of the selecting gate from 0 to supply voltage which are necessary for driving a piezoelectric item.

When the output of level shifter 35 is in the state of high, driving signals are generated from driver 36. When the output of the level shifter 35 is in the state of low, on the other hand, the driving signals are not generated.

Output terminals of driver 36 are connected to corresponding piezoelectric elements of each nozzle in head 17, and when driving signals are given from the driver 36 ink is jetted by the connected piezoelectric element of the nozzle, while when no driving signal is given, ink jet by means of the piezoelectric element of the nozzle connected to the terminal is not conducted.

FIG. 4 is a timing chart illustrating how driving signals conducting jet for all 8 gradations are generated.

Gradation control block 33 is reset by reset signal RST, and outputs drive control signals based on image data of latch 32. In the timing chart, drive control signals at the gradations from 0 gradation to 7 gradations are shown, and a waveform selected from these drive control signals for one pixel is outputted from gradation control block 33.

In the case of 8-gradation output image, the number of jets for ink drops ranges from 0 to 7. When 8 cycles of clock signal CLOCK is taken in consideration, the state of a low level appears 7 times. In the embodiment, therefore, when jetting ink drops for one jet with output for one gradation, the drive control signal is outputted in synchronization with the fall of clock signal CLOCK on the 4th jet so that ink may by jetted in synchronization with the 4th low level which is just the middle of 7 low levels. In the case of 4 gradations, drive control signals are outputted in synchronization with the fall of clock signal CLOCK on each of the 1st, 3rd, 5th and 7th jets so that jetting operations and non-jetting operations may appear alternately when jetting ink drops 4 times. In the case of gradations from not less than 5 gradations to the gradation less than the maximum density, it is arranged so that a non-jetting period does not continue although a period to jet ink drops continuously.

It is also arranged so that the state of high level of drive control signals may be symmetrical from side to side on the diagram. Namely, it is arranged so that the drive control signals for one gradation are outputted in synchronization with the timing of just half of the number of clocks of clock signal CLOCK for one pixel, and for two gradations or more, the drive control signal becomes to be at high level on the timing where the same number of clocks is added to and subtracted from the clock signal CLOCK which is synchronized with the timing of a just half.

When the output of gradation control block 33 is high, driving signals are outputted from driver 36 because selecting gate 34, namely level shifter 35 is high. Thus, head 17 jets ink to record on recording sheet P. When clock signal CLOCK arrives at 8th jet, gradation control block 33 is reset by reset signal RST again to be ready for outputting of the following image.

Next, an outputted image of an ink jet printer equipped with head driver 16 in the present embodiment and that: of a conventional ink jet printer will be compared to explain the difference between them, referring to FIGS. 8(a) and 8(b) and FIGS. 9(a) and 9(b).

Figure 8A:
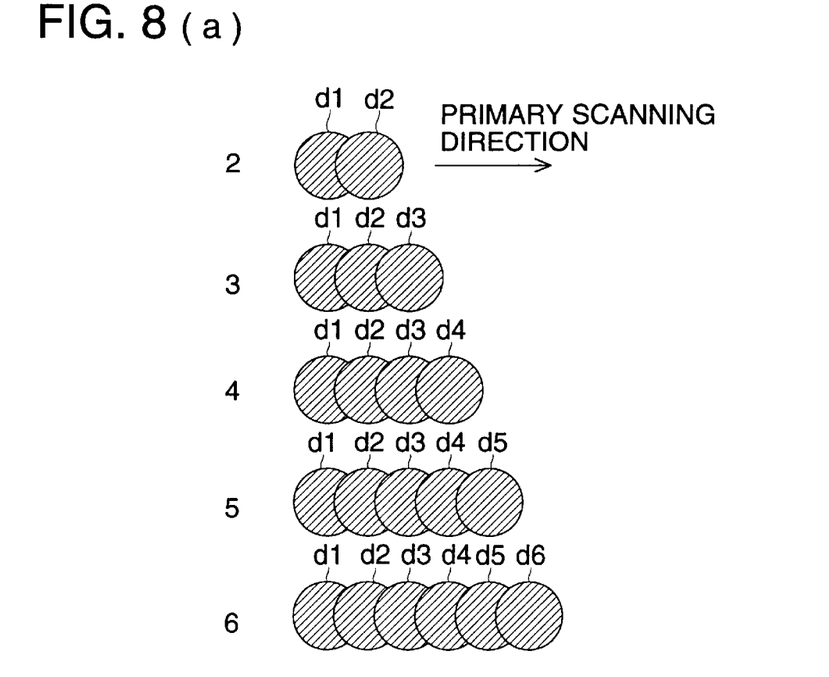
Figure 8B:
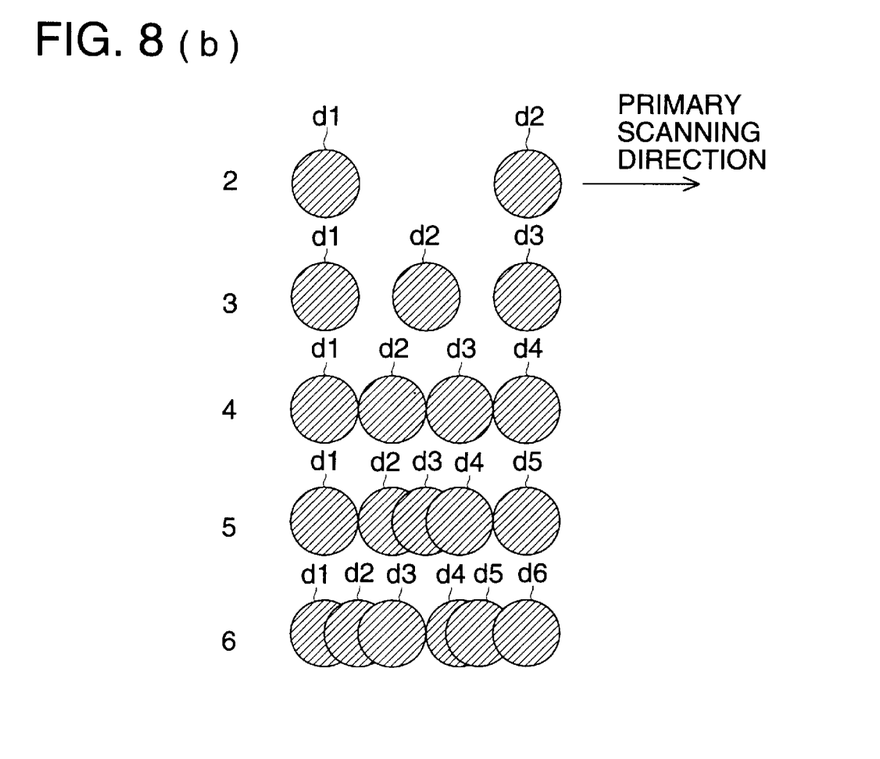
FIG. 8(b) shows a conceptual diagram wherein each pixel outputted by an ink jet printer provided with head driver 16 is enlarged and arranged.
Figure 9A:
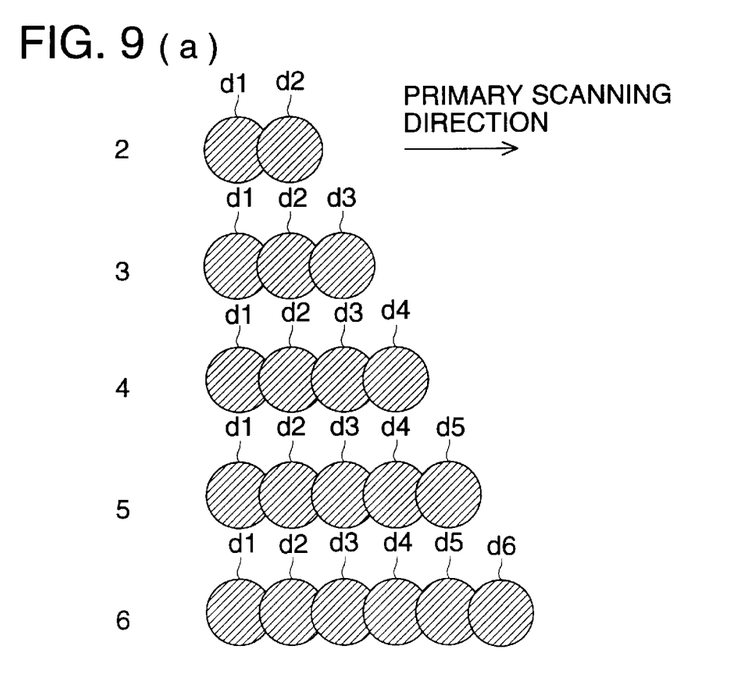
Figure 9B:
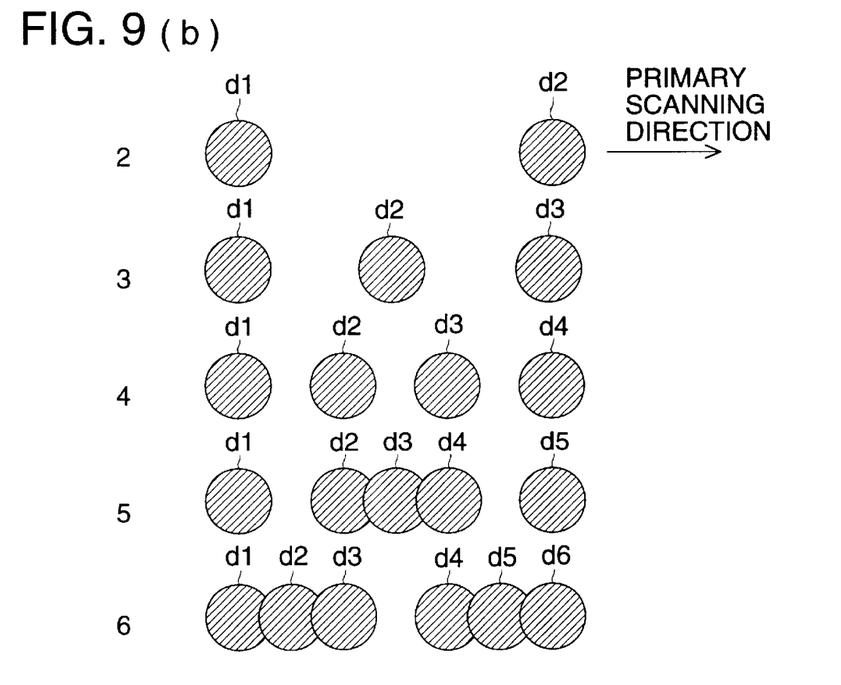
FIG. 9(b) shows a conceptual diagram wherein each pixel outputted by an ink jet printer provided with head driver 16 in which an amount of ink per one jet is less than that used in FIG. 8(b) is enlarged and arranged.

FIG. 8(a) is a conceptual diagram wherein each pixel outputted from a conventional ink jet printer is enlarged and arranged, while FIG. 8(b) is a conceptual diagram wherein each pixel outputted from an ink jet printer equipped with head driver 16 is enlarged and arranged. FIG. 9(a) is a conceptual diagram wherein each pixel outputted from a conventional ink jet printer in which a quantity of ink per jet is less than that used in FIG. 8(a) is enlarged and arranged, while FIG. 9(b) is a conceptual diagram wherein each pixel outputted from an ink jet printer equipped with head driver 16 in which a quantity of ink per jet is less than that used in FIG. 8(b) is enlarged and arranged.

In the conventional ink jet printer, due to outputting at continuous timing of ink jet, ink drops are superposed in succession to be stuck on a recording sheet starting from the side to start recording in the primary scanning direction as shown in FIG. 8(a). In the drawing, concepts of 2 gradations through 6 gradations are shown. Ink drops ranging from the first dot to 6th dot in each pixel are represented by d1 through d6. Since ink drops are superposed, even when the number of ink jets is increased, an area of ink adhesion for the second jet and thereafter is not an integral multiple for an area of ink adhesion for the first jet.

On the contrary to the foregoing, no superposition takes place in images shown in FIG. 8(b) outputted by head driver 16 because ink drops are spaced in the primary scanning direction for 2 through 4 gradations. Therefore, an area of ink adhesion for the outputted image is an integral multiple of an ink adhesion area for the first jet. Accordingly, outputted images whose gradation changes are extremely accurate can be obtained.

In example shown in FIG. 8(a) again, ink is surely stuck on the side to start recording in the primary scanning direction except an occasion of 0 gradation. Therefore, streaks are observed in the direction perpendicular to the primary scanning direction (sub-scanning direction) when 2-dimensional images are outputted.

When head driver 16 is used, on the other hand, streaks in the sub-scanning direction are reduced by the number of streaks which are made to zero by the first jet sticking to the center of a pixel.

FIGS. 9(a) and 9(b) show outputted images wherein an amount of jetted ink per dot is less than that in examples of FIGS. 8(a) and 8(b). FIG. 9(a) is an example of outputted images of a conventional ink jet printer, while FIG. 9(b) is an example of outputted images of an ink jet printer employing head driver 16. The invention is more effective when ink drops jetted by the ink jet printer are smaller. In addition, even when a recording medium which hardly accepts ink such as a glossy paper is used, an ink adhesion area for outputted images is an integral multiple of an ink adhesion area for the first jet, whereby, outputted images whose gradation changes are extremely accurate can be obtained.

The foregoing is a concrete example, and liquid drops which are based on driving signals of each gradation are jetted from head 17 so that gradation recording may be performed. Ink drops are recorded on recording sheet P in succession, and an area corresponding to the number of liquid drops can be recorded and thereby gradation recording is conducted. Then, when image data for the next pixel are latched from shift register 31 to latch 32, LOAD signal rises again, and driving signals wherein a high level period varies depending on the number of liquid drops of ink on a real time basis in accordance with results of comparison between a value of image data and a value of counter.

Since signals in parallel are converted into signals in series by gradation control block 33 as stated above, it is possible to take an arrangement wherein both shift register 31 related to the first storage means of the invention and latch 32 related to the second storage means of the invention can handle 4-bit data in parallel, which has made it possible to transfer image data in parallel from control board 9 to head driver 16.

Now, another embodiment will be explained, referring to FIG. 10.

Figure 3:
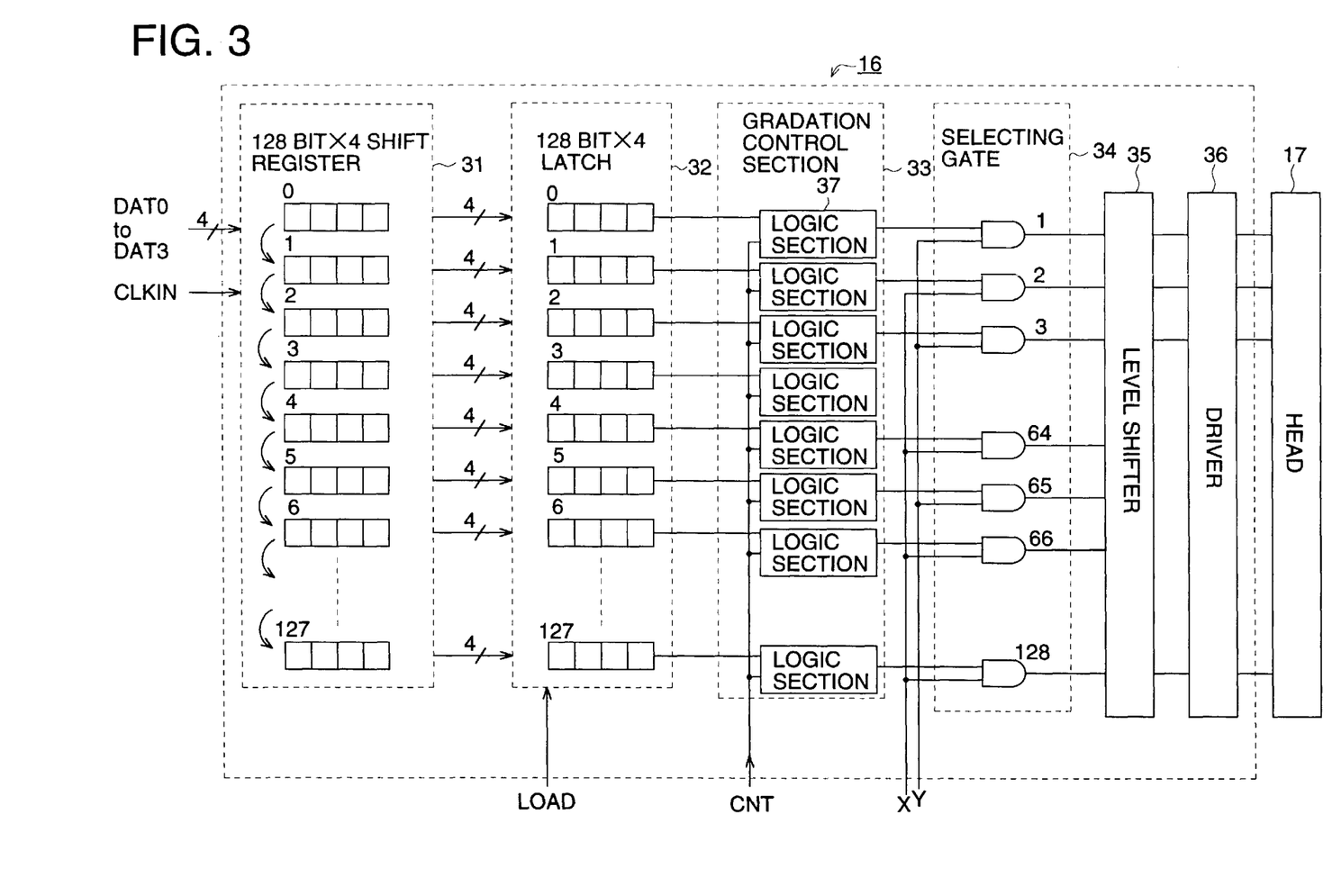
FIG. 3 is a block diagram of a head driver.
Figure 10:
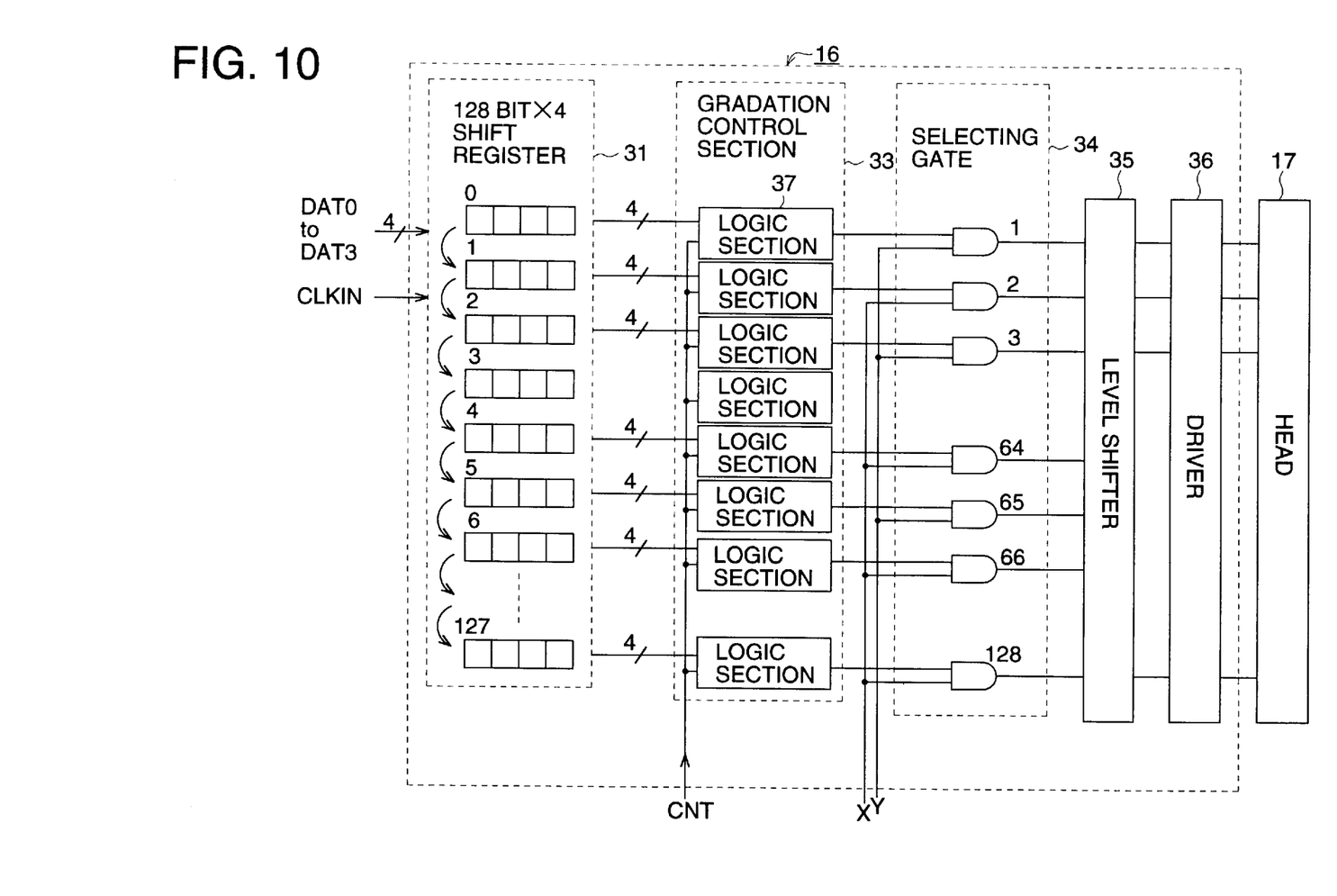
FIG. 10 is a block diagram of a head driver.

FIG. 10 is an example of a variation of the head driver shown in FIG. 3. FIG. 10 represents an example of the structure wherein latch 32 which is an example of the second memory of the invention in FIG. 3 is omitted. Symbol numbers in FIG. 10 which are the same as those in FIG. 3 have the same structure as in FIG. 3. Differences between FIG. 10 and FIG. 3 will be explained as follows.

In this diagram, when ink jet operations by head 17 are started, DATA0–DATA3 are inputted in succession into the first memory (128 bits×4 shift registers) in synchronization with CLKIN. At the state where inputting into 128 registers are all completed, input of CLKIN is suspended, and contents of registers are fixed.

Under this state, the first memory mentioned above comes to the state that is the same as that in the second memory. Namely, with regard to 4-bit registers, drive control signals depending on the density values are inputted into a selecting gate by gradation control block 33.

When parallel—serial conversion of data in the register conducted by gradation control block 33 is completed, data inputting into the first memory, namely, CLKIN is canceled, so that the following data may become possible to be inputted.

In the present example, ink jet from head 17 is impossible while data are being inputted into the first memory, however, when a period of data inputting, namely a period of transfer is sufficiently short compared with a period of ink jetting, it is possible to expect the effect which is mostly the same, without having the second memory.

Figure 11:
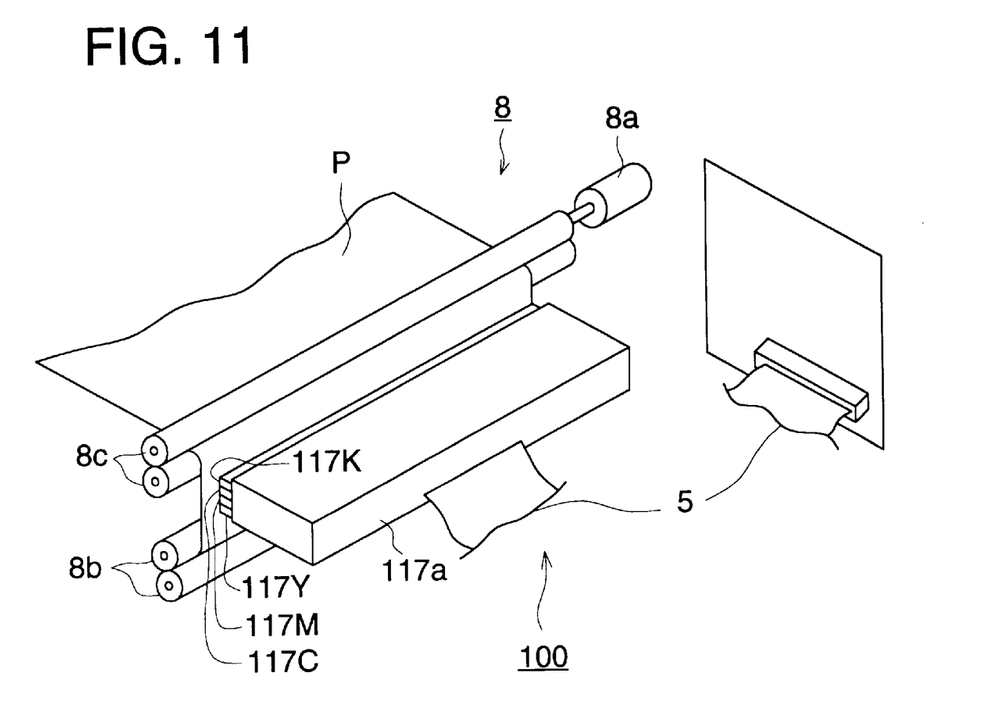
FIG. 11 is a perspective view showing primary portions of ink jet printer 100.

FIG. 11 is a perspective view showing primary portions in an example wherein the invention is applied on ink jet printer 100 having therein a line head.

In the case of line head 117, 128 nozzles per one color are arranged in the primary scanning direction in each of inner resin cases 117 Y, M, C and K, four cases of which are further housed in outer case 117a to be superposed. Operations to jet liquid drops are controlled by head driver 16 related to a driving apparatus for a multi-gradation printer of the invention which is also housed in the outer case 117a.

Sheet conveyance mechanism 8 conveys recording sheet P in the sub-scanning direction by means of conveyance motor 8a, paired conveyance rollers 8b and paired conveyance rollers 8c, similarly to ink jet printer 1. Other items such as control board 9 and head driver 16 of an IC type are the same as those in the ink jet printer 1. Ink jet printer 100 transfers image data transferred from a personal computer or the like to line memory 13 in the same manner as in the ink jet printer 1, and transfers image data expressed by gradation of 4 bits per pixel from the line memory 13 to head driver 16 connected with flexible cable 5. The head driver 16, when trigger-in signals TRGIN are inputted, causes ink to be jetted from nozzle head 17 to record on recording sheet P, in the same manner as that in the head driver 16 of the ink jet printer 1.

Figure 12:
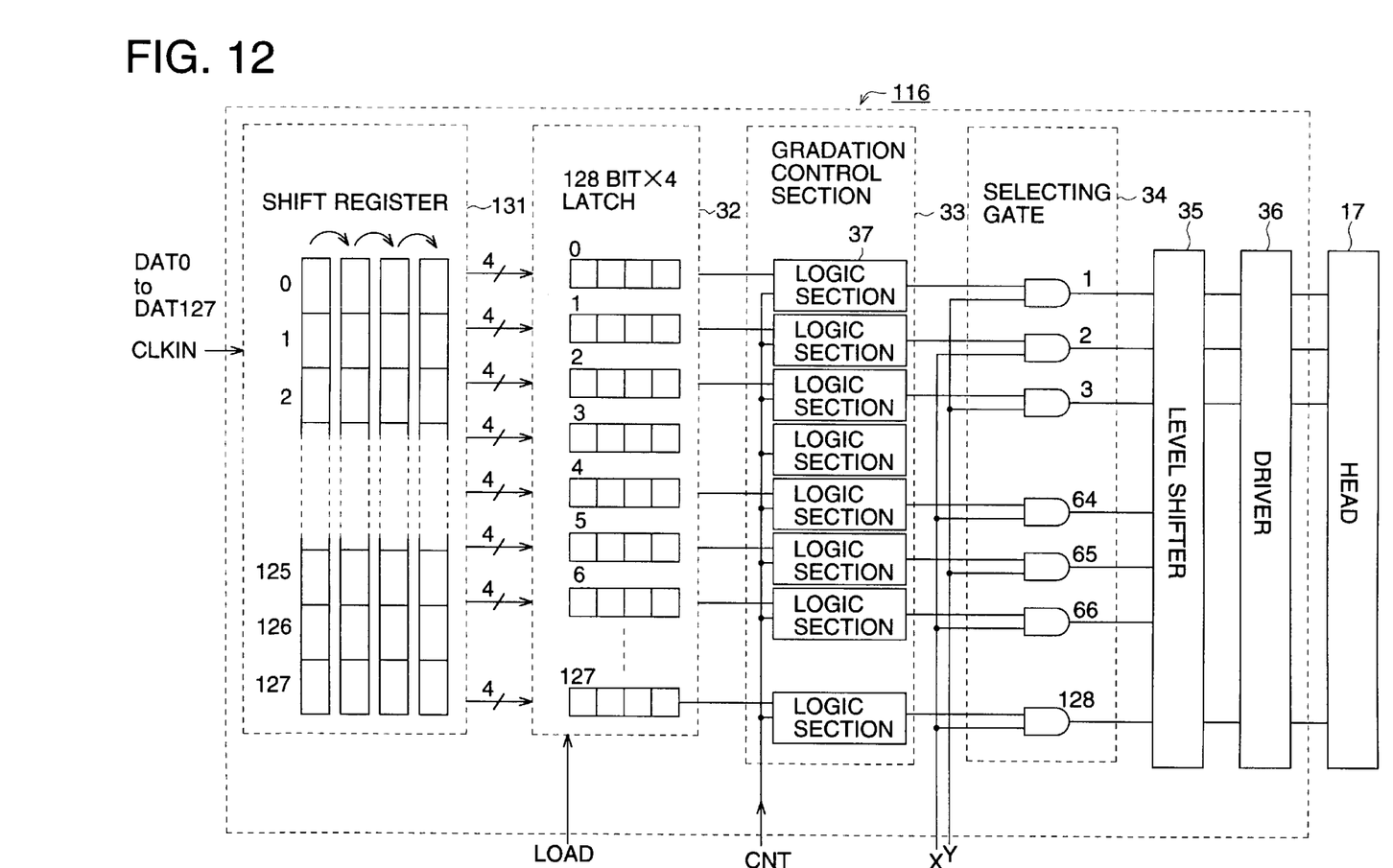
FIG. 12 is a block diagram of a head driver.

FIG. 12 is a block diagram illustrating primary portions of another example of a head driver related to a driving apparatus for a multi-gradation printer of the invention.

In the example of head driver 16, 4-bit gradation data constituting one pixel are transferred in succession from control board 9 through 4-bit data signal lines on a one image by one image basis. On the contrary to this, head driver 116 represents an example to transfer in succession from lower bits of 4-bit gradation data of 128 pixels through 128-bit data signal lines. Incidentally, constitutional members which are the same as those in FIG. 3 are given the same symbols.

From line memory 13, there are transferred in succession the gradation image data wherein one pixel is composed of plural bits, 4 bits in this case, starting from lower bits. A block diagram in FIG. 12 shows how lower bit data DAT0–DAT127 of the first 128 bits are transferred through 128-bit data signal lines.

Shift register 131 has capacity to store image data of pixels in quantity equivalent to one jet from nozzle head 17. In the present embodiment, too, image data equivalent to 128 pixels arranged in the sub-scanning direction are stored. When carriage 2 arrives at the position suitable for recording, control circuit 23 outputs LOAD signal, and when latch 32 receives this LOAD signal, it immediately latches image data outputted in parallel from shift register 31.

Then, the latch 32 outputs image data for gradation control block 33 as head driver 16 does. Since the other operation of head driver 116 is the same as that of head driver 16, it will not be explained here. For the example wherein the transfer speed for head driver 16 is improved by gradation per one pixel, the present example shows an occasion where the transfer speed for head driver 116 is improved by the number of nozzles provided in nozzle head 17.

As stated above, the invention has made it possible to conduct gradation recording at high speed, because data in parallel each having gradation information are transmitted, as they are, to a head driver to be processed. It further makes it possible to conduct gradation recording at high speed, because gradation recording is conducted after converting to the data to be recorded by the recording means, by converting to the intermitted data in series wherein a recording position in a recording pixel is portioned out by the position information signal outputting means depending on data in parallel each having gradation, namely, by converting to the intermitted data of one bit.

In addition to the foregoing, plural bits representing gradation are always portioned out to be recorded at a lattice point or at a target position. Therefore, it has become possible to prevent superposition at each pixel, and to obtain a gradation change accurately. Further, since the recording position at each pixel is portioned out, stripe-shaped noise is not caused on an image outputted when plural pixels are recorded.

What is claimed is:

1. A driving apparatus for a printer, comprising:
    (a) a first memory means for successively storing pixel data by one pixel on the basis of data of a plurality of bits constituting one pixel which represents gradation, which are inputted in parallel, and after storing a predetermined number of pixel data, for outputting in parallel the stored pixel data;
    (b) a position information signal outputting means provided in accordance with each of outputs from the first memory means for outputting a position information signal within a pixel according to each pixel data of the first memory means; and
    (c) a recording means provided in accordance with each of outputs from the position information signal outputting means and driven according to the position information signal within the pixel.

2. The driving apparatus of claim 1 further comprising:
    a second memory means for latching the pixel data outputted in parallel from the first memory means and for outputting in parallel latched pixel data,
    wherein the position information signal outputting means outputs the position information signal within the pixel in accordance with each pixel data of the first memory means through the second memory means.

3. The driving apparatus of claim 1 further comprising:
    a second memory means for latching the pixel data outputted in parallel from the first memory means and for outputting in parallel the latched pixel data,
    wherein the position information signal outputting means outputs the position information signal within the pixel in accordance with each pixel data of the first memory means through the second memory means, and
    wherein the first memory means successively stores pixel data, which are inputted in parallel in the order from a bit in a higher digit or in a lower digit of the plurality of bits.

4. The driving apparatus of claim 1 further comprising:
    a third memory means for storing a plurality of pixel data composed of data of the plurality bits constituting a pixel of which represents gradation, and for outputting in parallel the data of the plurality of bits,
    wherein the first memory means successively stores the image data of the plurality of bits by one pixel which the third memory means outputs in parallel, and after a predetermined number of pixel data are stored, the stored image data are outputted in parallel.

5. The driving apparatus of claim 1 further comprising:
    a selecting means for selecting output from the position information signal outputting means, and thereby a recording is conducted by a desired recording means among the recording means.

6. The driving apparatus of claim 1, wherein the position information signal is an information signal to record a plurality of dots in distributed positions within each pixel in a primary scanning direction so that recording positions for the plurality of dots are symmetrically arranged with respect to a center in each pixel.

7. A printer comprising:

(a) a first memory means for successively storing pixel data by one pixel on the basis of data of a plurality of bits constituting one pixel which represents gradation, which are inputted in parallel, and after storing a predetermined number of pixel data, for outputting in parallel the stored pixel data;

(b) a position information signal outputting means provided in accordance with each of outputs from the first memory means for outputting a position information signal within a pixel according to each pixel data of the first memory means; and (c) a recording means provided in accordance with each of outputs from the position information signal outputting means and driven according to the position information signal within the pixel;

(d) a carriage equipped with the first memory means, the position information signal outputting means and the recording means, being held movably when recording is conducted; and (e) a data transmitting means having a flexible property for transmitting data between the carriage and a base plate provided on a main body of the printer, and for following movement of the carriage.

8. The printer of claim 7 further comprising:

a second memory means for latching the pixel data outputted in parallel from the first memory means and for outputting in parallel the latched pixel data, wherein the position information signal outputting means outputs the position information signal within the pixel in accordance with each pixel data of the first memory means through the second memory means;

and wherein the carriage is further equipped with the second memory means.

9. The printer of claim 7 further comprising:

a second memory means for latching the pixel data outputted in parallel from the first memory means and for outputting in parallel the latched pixel data, wherein the position information signal outputting means outputs the position information signal within the pixel in accordance with each pixel data of the first memory means through the second memory means, wherein the first memory means successively stores pixel data, which are inputted in parallel in the order from a bit in a higher digit or in a lower digit of the plurality of bits, and wherein the carriage is further equipped with the second memory means.

10. The printer of claim 7 further comprising:

a third memory means for storing a plurality of pixel data composed of data of the plurality bits constituting a pixel of which represents gradation, and for outputting in parallel the data of the plurality of bits, wherein the first memory means successively stores the image data of the plurality of bits by one pixel which the third memory means outputs in parallel, and after a predetermined number of pixel data are stored, the stored image data are outputted in parallel.

11. The printer of claim 7 further comprising:

a selecting means for selecting output from the position information signal outputting means, and thereby a recording is conducted by a desired recording means among the recording means.

12. The printer of claim 7, wherein the position information signal is an information signal to record a plurality of dots in distributed positions within each pixel in a primary scanning direction so that recording positions for the plurality of dots are symmetrically arranged with respect to a center in each pixel.

13. The printer of claim 7, wherein the recording means conducts an ink jetting.

* * * * *